(12) United States Patent
Chawla et al.

(10) Patent No.: US 6,376,571 B1
(45) Date of Patent: *Apr. 23, 2002

(54) RADIATION-CURABLE COMPOSITION HAVING HIGH CURE SPEED

(75) Inventors: Chander P. Chawla, Batavia; Gerry K. Noren, Algonquin, both of IL (US)

(73) Assignee: DSM N.V., Heerlen (NL)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/035,773

(22) Filed: Mar. 6, 1998

Related U.S. Application Data (60) Provisional application No. 60/040,725, filed on Mar. 7, 1997.

(51) Int. Cl.[7] .............................. C08F 2/50; C09D 4/06; C09D 133/04
(52) U.S. Cl. .............................. 522/64; 522/96; 522/97; 522/172; 522/173; 522/181; 428/378; 385/115; 385/145
(58) Field of Search ............................ 522/96, 97, 181, 522/64, 182, 172, 173; 385/115, 145; 428/378

(56) References Cited

U.S. PATENT DOCUMENTS

| 5,093,386 | A | | 3/1992 | Bishop et al. | |
|---|---|---|---|---|---|
| 5,219,896 | A | * | 6/1993 | Coady et al. | 522/96 |
| 5,336,563 | A | | 8/1994 | Coady et al. | |
| 5,475,038 | A | * | 12/1995 | Skoultchi | 522/96 |
| 5,502,145 | A | * | 3/1996 | Szum | 528/28 |
| 5,670,260 | A | * | 9/1997 | Zajaczkowski et al. | 428/345 |
| 5,696,179 | A | * | 12/1997 | Chawla | 522/90 |

FOREIGN PATENT DOCUMENTS

| DE | 3437531 A1 | 4/1985 |
|---|---|---|
| GB | 2 163 443 A | 2/1986 |
| WO | 93/19185 | 9/1994 |

* cited by examiner

*Primary Examiner*—Susan W. Berman
(74) *Attorney, Agent, or Firm*—Pillsbury Winthrop LLP

(57) ABSTRACT

A fast curing radiation-curable composition useful as coating compositions for inner and outer primary coatings, inks, ribbons other matrix material coating layers for coating and surrounding optical fibers. The improved radiation-curable compositions, having a propoxylated monomer or oligomer component, demonstrate unexpectedly fast cure speeds while providing strong adhesion characteristics to a variety of substrates and can also be used as a general radiation-curable adhesive or can be adapted for use in the specialized process of digital versatile disk (DVD) production.

28 Claims, 2 Drawing Sheets

RADIATION-CURABLE COMPOSITION HAVING HIGH CURE SPEED

This application clims benefit to U.S. provisonal 60/040, 725 filed Mar. 7, 1997.

BACKGROUND OF THE INVENTION

1. Field of the Invention

The invention relates to radiation-curable compositions, and more particularly, to radiation-curable compositions having a high cure speed. The improved radiation-curable compositions have superior curing characteristics and are therefore useful as coating materials for various types of substrates including plastics, wood, porcelain, glass, paper, and the like, and as an optical molding material, three-dimensional rapid prototyping molding material, printing plate material, and the like. The improved radiation-curable compositions are well suited for use as radiation-curable coating compositions on glass-optical fibers. The improved radiation-curable compositions also demonstrate superior adhesion characteristics when applied to a variety of substrates and can be useful as general radiation-curable adhesives or more particularly as adhesives in the production technology for digital versatile disks (DVD).

2. Description of Related Art

Radiation-curable compositions have been used to provide coatings for optical glass fibers. Optical glass fibers are generally coated with two superposed radiation-cured coatings, which together form a primary coating. The coating which is in direct contact with the glass is called the inner primary coating and the overlaying coating(s) is called the outer primary coating.

The inner primary coating is usually a relatively soft coating providing environmental protection to the glass fiber and resistance, inter alia, to the well-known phenomenon of microbending. Microbending in the coated fiber can lead to attenuation of the signal transmission capability of the coated fiber and is therefore undesirable. The outer primary coating(s), which is on the exposed surface of the coated fiber, is typically a relatively harder coating designed to provide a desired resistance to physical handling forces, such as those encountered when the fiber is cabled.

Such primary coating systems are typically prepared from radiation-curable optical glass fiber coating compositions (hereinafter referred to as "radiation-curable composition"). It is a characteristic of such systems that the curing proceeds upon exposure to a radiation source, typically a UV actinic radiation source, for a time sufficient to provide a full cure of the coating compositions at the level of intensity of such source. Examples of typical radiation-curable coatings are described in published European patent application No. 566801, published PCT application WO-A-9103499, and U.S. Pat. Nos. 5,146,531, 5,219,896 and 5,336,563.

As the demand for coated optical glass fibers has increased, manufacturers must respond by adding more fiber drawing production lines and by attempting to increase the linear line speeds of the existing fiber drawing production lines. In the latter case, one factor which will determine the upper limit for the line speed will be the curing rate characteristics of the radiation-curable compositions for a given radiation source and intensity.

If the line speed is increased to the extent that cure rate time requirements of the radiation-curable composition are exceeded, the radiation-curable composition will not have received a sufficient amount of radiation to cause complete cure, or cross-linking, of the radiation-curable composition. The linear line production speed is generally inversely related to the amount of radiation striking the optical glass fiber. That is, as the production line speed is increased the amount of radiation exposure to the radiation-curable composition during the production process will necessarily decrease for a given radiation source. Incomplete cure of the radiation-curable composition is undesirable and must be avoided because then the desired protective properties of the incompletely cured primary coating may not be achieved and/or the incompletely cured primary coating may retain tackiness (giving problems in subsequent handling) or a malodorous odor may be present. There may also be an increase in the extractables (undesirable) in the supposedly-cured coating.

In general, radiation-curable inner primary coating compositions cure at a significantly slower rate than radiation-curable outer primary coating compositions. It is believed that the reduced number of radiation-curable functional groups present in inner primary compositions compared to outer primary compositions contributes to the slower cure speed of inner primary coatings. While there exists a greater need for improving the cure speed of the inner primary coating, the need for fast curing speeds of radiation-curable compositions employed in each of the multiple coating layers surrounding optical fibers must be met.

Although line speeds have increased over the years, it is believed that a radiation-curable inner primary coating composition, having a cure speed such that 95% or more of the maximum attainable tensile modulus is attained at an irradiation dose of about 0.30 J/cm$^2$ or less at a thickness of 75 microns, is difficult to achieve.

Such a high cure speed radiation-curable composition would also be useful in other applications where cure speed is of importance.

Radiation-curable compositions having fast cure speed can be particularly useful in stereolithography or rapid prototyping processes. Rapid prototyping involves successive curing of defined areas of resin layers on top of each other to make a three-dimensional form that can be used as a prototype, or for making a prototype. A prototype, or model, is often used in order to prepare for making new products.

An example of a rapid prototyping process is the Cubital process described in U.S. Pat. No. 5,031,120 (Pomerantz). In the Cubital process, light is passed through an erasable mask to solidify a layer of a radiation-curable, resin composition in selected areas. The non-solidified portions are removed and replaced by a removable support material, such as wax. Additional layers are added until the desired three-dimensional object is completely formed. The removable support material is commonly a wax which can be removed by melting or dissolving to provide the thereby formed, free three-dimensional object.

Another example of a rapid prototyping process is disclosed in U.S. Pat. No. 4,575,330 (Hull). The Hull process is a scanning method, in which a concentrated beam of ultraviolet light is focused on the surface of a container filled with a liquid radiation-curable, resin composition.

The light beam, moving under computer control, scribes a layer of the object onto the surface of the liquid. Wherever the beam strikes the surface, a very thin layer of the radiation-curable, resin composition is crosslinked to form a solid. To make a three-dimensional object, the entire operation is repeated, with the position of the object shifted slightly each time, whereby the object is built up layer by layer.

Examples of radiation-curable, resin compositions that have been used in rapid prototyping methods are disclosed in U.S. Pat. Nos. 5,418,112 and 5,434,196. There is always a need for a faster curing composition for use in rapid prototyping processes to decrease production time.

Radiation-curable compositions having fast cure speed can also be useful in the production of digital versatile disks (DVD). Digital versatile disks may be created by variations on a few basic processes, as disclosed, for example, by U.S. Pat. No. 4,310,919 and U.S. Pat. No. 4,423,137, the complete disclosures of which are fully incorporated herein by reference. Three technologies are currently employed for DVD bonding, namely contact adhesives, cationic or PSA UV bonding, and free radical UV bonding. The formulations must provide adhesion between the aluminum and poly carbonate layers, the gold and polycarbonate layers, and the lacquer and the polycarbonate layers. Furthermore, the adhesive coatings must have a high cure speed. However, strong, long-lasting adhesion between DVD component layers, without compromising the other desirable properties such as good release from molds or the optical properties of the polycarbonate, is not achievable with the existing systems. For example, coatings which possess strong adhesion to metallic surfaces may do so at the expense of good release or desirably fast cure speed.

Radiation-curable compositions demonstrating fast cure speed and strong adhesion to a wide variety of substrates can also be useful as general-use radiation-curable adhesives. Typically such adhesives can be employed in the manufacture of coated articles or laminated articles such as eye-glass lenses or automobile safety glass. Other uses for radiation-curable adhesives range from laboratory equipment manufacture, surgical instrument applications, and any general use for a radiation-curable adhesive used under circumstances requiring fast cure speed. Conventional adhesives, not cured by exposure to radiation, frequently demonstrate problems of setting too quickly without allowing time for adjustment of physical placement of the substrate to which the adhesive is applied. In safety-glass or other laminated glass applications, air bubbles often are formed and may become trapped between the layers of glass. Such errors in production can not be easily corrected using conventional adhesion processes and thus result in considerable delays in production and the costly waste of materials. In contrast, radiation-curable adhesives used in such applications permit any necessary adjustments of the substrates in relation to each other prior to curing the radiation-curable adhesive by exposure to radiation.

A high cure speed radiation-curable composition would also be useful for forming protective or decorative coatings on substrates, such as wood, glass, paper, porcelain and plastics. For example, a high cure speed radiation-curable composition would be very desirable for use as a coating on a wood or vinyl (plastic) floor. The faster curing coating would generally require less exposure to UV light to cure and the coated floor would be ready for use in a shorter time period.

SUMMARY OF THE INVENTION

An object of the present invention is to provide a radiation-curable composition which exhibits an enhanced cure speed.

Another object of the present invention is to provide high cure speed radiation-curable compositions which are adapted for general uses as well as specifically designed coatings including inner primary optical glass fiber coating compositions, outer primary optical glass fiber coating compositions, inks, ribbons and other matrix material layers used for coating optical glass fiber assemblies.

Another object of the present invention is to provide high cure speed radiation-curable compositions which are adapted for use as stereolithography or rapid prototyping coating compositions.

Another object of the present invention is to provide high cure speed radiation-curable compositions which can be used as general adhesives for a wide variety of substrates. In particular, such compositions can be adapted for use as specialized adhesives necessary for the production of digital versatile disks (DVD).

Another object of the present invention is to provide a radiation-curable composition which has a cure speed such that 95% or more of the maximum attainable tensile modulus is achieved using an irradiation dose of about 0.30 J/cm$^2$ or less at a thickness of 75 microns.

It has now been found, that by formulating a radiation-curable composition to contain an unusually large amount of what is now understood to be a cure speed enhancing radiation-curable monomer or oligomer, surprisingly the cure speed of a desired radiation-curable composition can be greatly increased.

Surprisingly, the above objectives and other objectives can be achieved by formulating a radiation-curable composition to contain a cure speed enhancing radiation-curable monomer or oligomer having at least one functional group capable of polymerization in the presence of radiation being directly connected to a propoxy group, the cure speed enhancing radiation-curable monomer or oligomer being present in an amount sufficient to provide the radiation-curable composition with a cure speed such that 95% or more of the maximum attainable tensile modulus is attained at an irradiation dose of about 0.30 J/cm$^2$ or less at a thickness of 75 microns.

Also provided is a coated substrate including a substrate and a coating on the substrate formulated from a radiation-curable coating including a cure speed enhancing radiation-curable monomer or oligomer having at least one functional group capable of polymerization in the presence of radiation being directly connected to a propoxy group. The cure speed enhancing radiation-curable monomer or oligomer should be present in an amount sufficient to provide the radiation-curable composition with a cure speed such that 95% or more of the maximum attainable tensile modulus is achieved using an irradiation dose of about 0.30 J/cm$^2$ or less at a thickness of 75 microns.

DETAILED DESCRIPTION OF PREFERRED EMBODIMENTS

Radiation-curable compositions are now well known in the art. Based on the disclosure provided herein, one skilled in the art will be able to reformulate known radiation-curable compositions to achieve an unexpected increase in cure speed according to the present invention.

Examples of suitable radiation-curable compositions which may be reformulated variously include those which are disclosed in U.S. Pat. Nos. 4,624,994; 4,682,851; 4,782,129; 4,794,133; 4,806,574; 4,849,462; 5,219,896; and 5,336,563, the complete disclosures of which are fully incorporated herein by reference.

Such radiation-curable compositions contain one or more radiation-curable oligomers or monomers having at least one functional group capable of polymerization when exposed to actinic radiation. Suitable radiation-curable oligomers or monomers are now well known and within the skill of the art. Preferably, the radiation-curable oligomer is a "urethane acrylate oligomer", which comprises an acrylate functional group connected to a carbon-containing backbone, such as a polyether, polyolefin, polyester, or polycarbonate, via a urethane linking group. Such urethane acrylate oligomers are well-known in the art.

Commonly, the radiation-curable functionality employed has ethylenic unsaturation, which can be polymerized through radical polymerization. Specific examples of suitable ethylenic unsaturation are groups containing acrylate, methacrylate, vinyl aromatic (aryl), styrene, vinyl ketone vinylether, vinyl ester, N-substituted acrylamide, N-vinyl amide, maleate esters, and fumarate esters. Preferably, the ethylenic unsaturation is provided by a group containing acrylate or methacrylate functionality.

The radiation-curable compositions may also contain a reactive diluent which is used to adjust the viscosity. The reactive diluent can be a low viscosity monomer having at least one functional group capable of polymerization when exposed to actinic radiation. This functional group may but need not be of the same nature as that used in the radiation-curable monomer or oligomer. Preferably, the functional group present in the reactive diluent is capable of copolymerizing with the radiation-curable functional group present on the radiation-curable monomer or oligomer.

For example, the reactive diluent can be a monomer or mixture of monomers having an acrylate or vinyl ether functionality and an $C_4$–$C_{20}$ alkyl or polyether moiety. Particular examples of such reactive diluents include:

hexylacrylate,
2-ethylhexylacrylate,
isobornylacrylate,
decylacrylate,
laurylacrylate,
stearylacrylate,
2-ethoxyethoxy-ethylacrylate,
laurylvinylether,
2-ethylhexylvinyl ether,
N-vinyl formamide,
isodecyl acrylate,
isooctyl acrylate,
vinyl-caprolactam,
N-vinylpyrrolidone,
and the like.

Nitrogen-containing vinyl lactam reactive diluents like vinyl-caprolactam and N-vinylpyrrolidone can be used to increase cure speed. However, there use may lead to undesired yellowing and increased moisture absorption.

Another type of reactive diluent that can be used is a compound having an aromatic group. Particular examples of reactive diluents having an aromatic group include: ethyleneglycolphenyletheracrylate, polyethyleneglycolphenyletheracrylate, and alkyl-substituted phenyl derivatives of the above monomers, such as polyethyleneglycolnonylphenyletheracrylate.

The reactive diluent can also comprise a diluent having two or more functional groups capable of polymerization. Particular examples of such monomers include:

$C_2$–$C_{18}$ hydrocarbon-dioldiacrylates,
$C_4$–$C_{18}$ hydrocarbondivinylethers,
$C_3$–$C_{18}$ hydrocarbon triacrylates, and the polyether analogues thereof, and the like, such as
1,6-hexanedioldiacrylate,
trimethylolpropanetriacrylate,
hexanedioldivinylether,
triethylene-glycoldiacrylate,
pentaerythritol-triacrylate,
ethoxylated bisphenol-A diacrylate, and
tripropyleneglycol diacrylate.

Other additives which can be used in the coating composition include, but are not limited to, photoinitiators, catalysts, lubricants, wetting agents, antioxidants and stabilizers. The selection and use of such additives is within the skill of the art.

Figure 1:
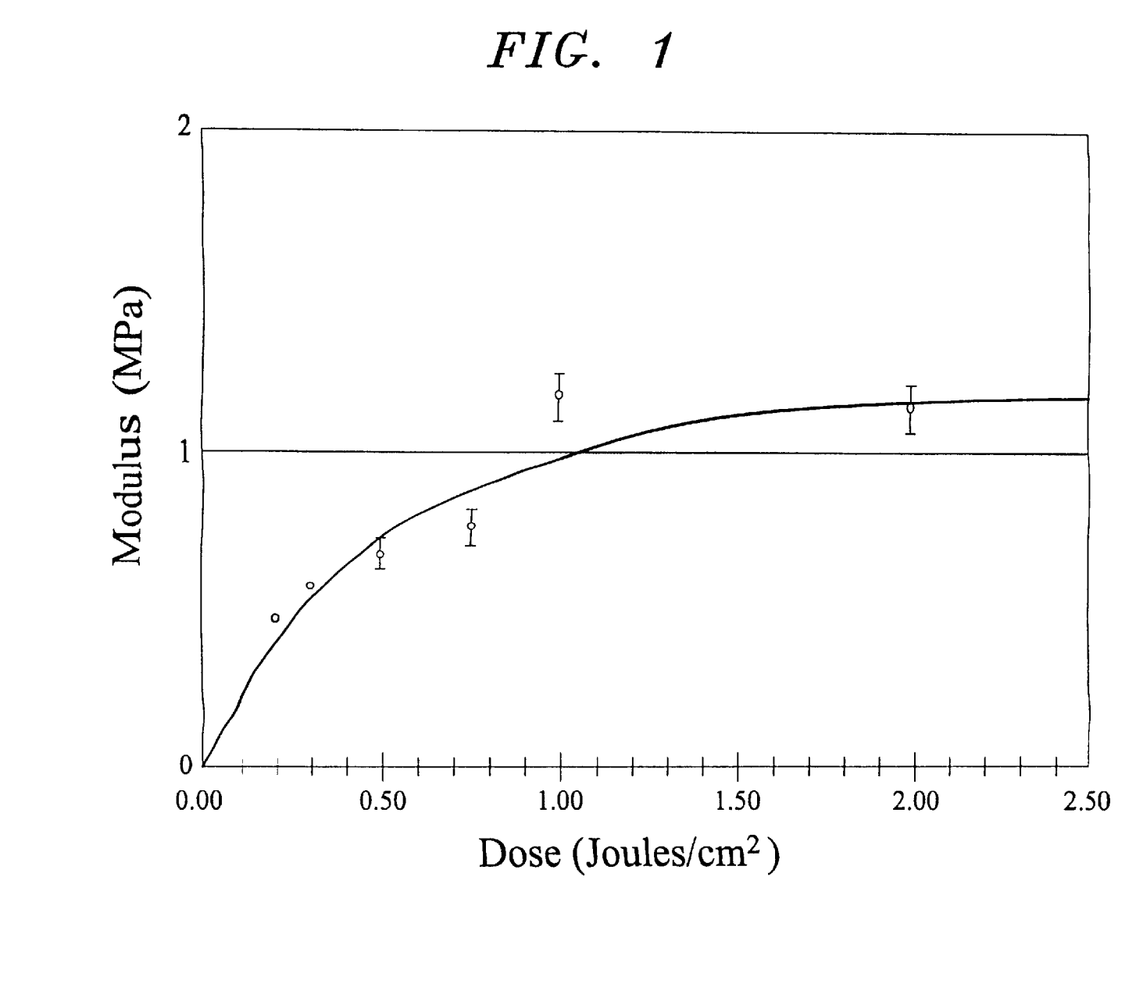
FIG. 1 illustrates a graph of the modulus versus the radiation dose applied to a typical inner primary coating composition.

Typical radiation-curable compositions usually exhibit the behavior shown in FIG. 1. FIG. 1 is the radiation dose versus modulus for the composition of Comparative Example H. As shown in FIG. 1, as the amount of radiation that a radiation-curable composition is exposed to is increased, the amount of a specific physical or performance property of the cured coating (measured as a percentage of the fully attainable value for the specific composition) correspondingly increases. This increase continues until the maximum attainable value of the measured physical or performance property is achieved. The maximum attainable value of a physical or performance property cannot be exceeded by further exposure to radiation. Examples of physical or performance properties are (tensile) modulus, glass transition temperature, hardness, surface adhesion, and remaining extractables. Modulus is used herein by way of example.

As shown in FIG. 1, once the measured modulus reaches the maximum attainable value, further exposure to radiation does not result in an increase in the modulus. For purposes of comparing cure speeds among different radiation-curable compositions, the cure speed is represented by the radiation dose which provides 95% of the maximum attainable tensile modulus at a thickness of 75 microns. The lower the radiation dose required to attain 95% of the maximum attainable tensile modulus, the faster the cure speed. If desired, other physical properties can be used to compare the cure speeds of different radiation-curable compositions, however, the modulus is preferred.

It has now been found that by formulating a radiation-curable composition so as to contain an unusually large amount of a cure speed enhancing radiation-curable monomer or oligomer, surprisingly the cure speed of the radiation-curable composition can be greatly increased. The cure speed enhancing monomer or oligomer comprises a propoxy group directly connected to a radiation-curable group. Propoxy groups are represented by the branched structures —[CH(CH₃)—CH₂—O]— or —[CH₂—CH(CH₃)—O]— rather than the linear structure —[CH₂CH₂CH₂O]—.

The cure speed enhancing radiation-curable monomer or oligomer, herein after referred to as the propoxylated monomer or oligomer, can contain more than one radiation-curable functional group. Preferably, each radiation-curable functional group present in the propoxylated monomer or oligomer is directly connected to a propoxy group. Thus in the present invention, the propoxylated monomer or oligomer can be monofunctional or multifunctional, as determined by the number of functional groups on the propoxylated monomer or oligomer.

When the radiation-curable composition of the present invention contains a monofunctional propoxylated monomer or oligomer, the monofunctional monomer or oligomer should be present in an amount which provides the desired radiation-curable composition with a cure speed such that 95% or more of the maximum attainable tensile modulus is achieved using an irradiation dose of about 0.30 J/cm$^2$ or less, and preferably, about 0.25 J/cm$^2$ or less, and more preferably, about 0.20 J/cm$^2$ or less at a thickness of 75 microns. Examples of such amounts have been found to be at least about 30 wt. %, and preferably, at least about 45% by weight, and more preferably, at least about 55% by weight of the total weight of the radiation-curable composition. The maximum amount can be about 95 wt. %, and preferably, about 80 wt. %.

When the radiation-curable composition of the present invention contains a multifunctional propoxylated monomer or oligomer, the multifunctional monomer or oligomer can be present in an amount of between about 5 wt. % and about 80 wt. %.

The cure speed enhancing radiation-curable monomer comprises at least one propoxy group which can be represented by —[CH(CH$_3$)—CH$_2$—O]— or —[CH$_2$—CH(CH$_3$)—O]—. Multiple propoxy groups can be present including combinations of —[CH(CH$_3$)—CH$_2$—O]— and —[CH$_2$—CH(CH$_3$)—O]— wherein one of the propoxy groups is directly connected or bonded to the radiation-curable functional group.

The radiation-curable functional group can be any known radiation-curable functional group, including those defined herein above. Preferably, the selected radiation-curable functional group present in the cure speed enhancing radiation-curable monomer is the same as a radiation-curable functional group present on another monomer or oligomer present in the selected radiation-curable composition to enhance co-polymerization. Most preferably, the radiation-curable functional group is an acrylate. It is believed that an acrylate functional group will provide a faster cure speed compared to other radiation-curable functional groups.

The cure speed enhancing radiation-curable monomer or oligomer can contain more than one radiation-curable functional group. Preferably, each radiation-curable functional group present in the cure speed enhancing radiation-curable monomer or oligomer is directly connected to a propoxy group.

An example of a preferred radiation-curable functional group being "directly" connected to a substituted alkylene oxide group is represented by the following formula 1:

(1)

wherein [R$_1$O]$_n$ represents one or more substituted alkylene oxide (propoxy preferred) groups directly connected to an acrylate group. The group repeat unit, [R$_1$O], can be represented by —[CH(R)—CH$_2$—O]— or —[CH$_2$—CH(R)—O]—, where R is an alkyl or aryl group with 1–20 carbon atoms.

In formula (1), in the preferred embodiment, the number of propoxy groups, n, preferably will be less than about 12, and more preferably, less than 6. The number of propoxy groups, n, can be represented by an average when mixtures of different cure speed enhancing monomers or oligomers are used. Thus, the number of propoxy groups, n, can be a non-integer.

In formula (1), R$_2$ connects with the n propoxy units. R$_2$ can be hydrogen although this is not generally preferred. R$_2$ also can be a carbon-containing compound, such as a linear, branched, or cyclic alkyl, ether, polyether, polyolefin, polyester or polycarbonate group or urethane oligomer.

If a lower molecular weight cure speed enhancing monomer is desired, the group, R$_2$, can contain about 1 to 20 carbons. Examples of lower molecular weight carbon containing groups include alkyls such as methyl, ethyl, n-butyl, i-butyl, t-butyl, 2-ethylhexyl, n-hexyl, iso-octyl, n-nonyl, i-nonyl, and dodecanol, and cyclic alkyls such as cyclopentane and cyclohexane. A lower molecular weight group, R$_2$, can also be an aromatic group such as optionally substituted benzene or pyridine. Furthermore, a lower molecular weight group, R$_2$, can also comprise one or more ether groups such as an ethoxy or propoxy, including linear propoxy. If R$_2$ comprises propoxy groups, these groups are not included in the calculation of n.

Preferably, R$_2$ in formula 1 comprises an aromatic ring. An example is represented by the following formula (2):

(3)

wherein R$_1$ and n are defined in formula (2) as in formula (1), and Ar represents an aromatic ring in which the aromatic ring hydrogens optionally can be substituted with one or more R$_3$ groups. Preferably, the aromatic ring, Ar, comprises a benzene ring, and more preferably, comprises a benzene ring which contains at least one substituted group R$_3$. The optional substituent group R$_3$ on the aromatic ring can be a carbon-containing group as discussed above for R$_2$. The optional aromatic ring substituent, R$_3$, is preferably an alkyl group having 1 to about 12 carbon atoms. The alkyl group may be straight chained or branched. Specific examples of suitable alkyl groups include methyl, ethyl;- n-butyl, i-butyl, t-butyl, 2-ethylhexyl, n-hexyl, iso-octyl, n-nonyl, i-nonyl, and dodecanol. Particularly preferred is nonyl.

Examples of particularly preferred cure speed enhancing radiation-curable oligomers include propoxylated (alkyl) phenol acrylates having on average about 2 to about 6 propoxyl units. More preferably, the cure speed enhancing oligomer is a propoxylated (nonyl)phenol acrylate having on average about 2 to about 6 propoxyl units. A commercially available example is Aronix M117 (Toagasei).

In formula (1), higher molecular weight groups for R$_2$ are also suitable including those having more than 20 carbon atoms. Specific examples of higher molecular weight carbon containing compounds include polyolefins, polyethers, polycarbonates and polyesters. For example, the polyether can comprise repeating units of one or more of the following monomer groups:

-continued

Hence, the polyether can be made from epoxy-ethane, epoxy-propane, tetrahydrofuran, methyl-substituted tetrahydrofuran, epoxybutane, and the like. An example of a polyether that can be used is the polymerization product of 20 percent by weight of 3-methyltetrahydrofuran and 80 percent by weight of tetrahydrofuran, both of which have undergone a ring-opening polymerization. This polyether copolymer contains both branched and non-branched oxyalkylene repeating units and is marketed as PTG-L 1000 (Hodogaya Chemical Company of Japan). Another example of a polyether that can be used is PTG-L 2000 (Hodogaya Chemical Company).

If a polyolefin is used, the polyolefin is preferably a linear or branched hydrocarbon containing hydroxyl end groups through which functional groups can be connected to the polyolefin backbone. If long term stability is desired, fully saturated, for example, hydrogenated hydrocarbons, are preferred because the long term stability of the cured optical fiber coating increases as the degree of unsaturation decreases.

A polyolefin diol can be used to form the desired cure speed enhancing oligomer. One skilled in the art knows how to react polyolefin diols to connect them to the propoxy group. Examples of hydrocarbon diols include, for example, hydroxyl-terminated, fully or partially hydrogenated 1,2-polybutadiene; 1,4- or 1,2-polybutadiene copolymers, 1,2-polybutadiene-ethylene or -propylene copolymers, poly-isobutylene polyol; mixtures thereof, and the like. Preferably, the hydrocarbon diol is a substantially, fully hydrogenated 1,2-polybutadiene or 1,2-polybutadiene-ethene copolymer.

Examples of polycarbonate diols are those conventionally produced by the alcoholysis of diethylene carbonate with a diol. The diol can be, for example, an alkylene diol having about 2 to about 12 carbon atoms, such as, 1,4-butane diol, 1,6-hexane diol, 1,12-dodecane diol, and the like. Mixtures of these diols can also be utilized. The polycarbonate diol can contain ether linkages in the backbone in addition to carbonate groups. Thus, for example, polycarbonate copolymers of alkylene oxide monomers and the previously described alkylene diols can be used. Alkylene oxide monomers include, for example, ethylene oxide, tetrahydrofuran, and the like. These copolymers produce cured coatings that exhibit a lower modulus and also inhibit crystallinity of the liquid coating composition compared to polycarbonate diol homopolymers. Admixtures of the polycarbonate diols and polycarbonate copolymers can also be utilized for forming the desired cure speed enhancing oligomer.

Commercial examples of polycarbonate diols include, for example, Duracarb 122 (PPG Industries) and Permanol KM10-1733 (Permuthane, Inc., Ma.). Duracarb 122 is produced by the alcoholysis of diethylcarbonate with hexane diol.

Examples of polyester diols that can be used to form the desired cure speed enhancing oligomer include the reaction products of saturated polycarboxylic acids, or their anhydrides, and diols. Saturated polycarboxylic acids and anhydrides include, for example, phthalic acid, isophthalic acid, terephthalic acid, trimellitic acid, tetrahydrophthalic acid, hexahydrophthalic acid, tetrachlorophthalic acid, adipic acid, azelaic acid, sebacic acid, succinic acid, glutaric acid, malonic acid, pimelic acid, suberic acid, 2,2-dimethylsuccinic acid, 3,3-dimethylglutaric acid, 2,2-dimethylglutaric acid, the like, anhydrides thereof and mixtures thereof. Diols include, for example, 1,4-butanediol, 1,8-octane diol, diethylene glycol, 1,6-hexane diol, dimethylol cyclohexane, and the like. Included in this classification are the polycaprolactones, commercially available from Union Carbide under the trade designation Tone Polylol series of products, for example, Tone 0200, 0221, 0301, 0310, 2201, and 2221. Tone Polyol 0301 and 0310 are trifunctional.

If a higher molecular weight carbon containing group is used, such as a polyolefin, the carbon containing chain can be utilized as a backbone to which a plurality of radiation-curable functional groups can be connected via propoxy groups, to provide a cure speed enhancing oligomer having a plurality of radiation-curable functional groups each being directly connected to a propoxy group. These oligomers can be bound to the propoxyacrylate through a urethane bond by, for example, reacting hydroxypropyl acrylate with a diisocyanate and with a mono- or di-hydroxyfunctional oligomer.

One skilled in the art will easily be able to make the desired cure speed enhancing monomer or oligomer. For example, the selected type of radiation-curable compound containing a halogen can be reacted with a propoxylated compound containing a hydroxyl group, under basic conditions to form a cure speed enhancing monomer or oligomer containing the radiation-curable functional group directly connected to a propoxy group. An example of such a reaction is as follows:

If the radiation-curable composition formulated according to this invention is cured via a free-radical mechanism, the cure rate can be maximized by avoiding use of substantial amounts of compounds that can retard the radical-curing polymerization reactions, such as for example sulphur containing chain transfer agents. However, an effective amount of inhibitor to prevent a premature polymerization reaction can be used.

If the radiation-curable composition is to be used as a primary coating for an optical glass fiber, and a monofunctional propoxylated monomer or oligomer is to be used in the composition, a particularly preferred radiation-curable optical glass fiber coating composition comprises:

a) an acrylate urethane oligomer;
b) at least about 30 wt % of a propoxylated (alkyl)phenol acrylate;
c) optionally one or more reactive diluents; and d) optionally an effective amount of at least one photo-initiating compound, and e) optionally additives.

Preferably, the radiation-curable coating contains a sufficient amount of propoxylated monomer or oligomer to provide a cure speed such that 95% of the maximum attainable tensile modulus is obtained after an irradiation dose of less than about 0.30 J/cm$^2$ at a thickness of 75 microns.

More preferably, the radiation curable optical glass fiber coating composition containing a monofunctional propoxylated monomer or oligomer comprises:

a) about 30 wt. % to about 60 wt % of an acrylate functional urethane oligomer;

b) about 45 wt. % to about 70 wt % of a propoxylated (alkyl)phenol acrylate;

c) optionally up to about 10 wt % of one or more photoinitiators;

d) optionally up to about 33 wt % of one or more reactive diluents;

e) optionally up to about 10 wt % of an adhesion promoter; and f) optionally up to about 5 wt % of additives.

If the radiation-curable composition is to be used as a primary coating for an optical glass fiber, and a multifunctional propoxylated monomer or oligomer is to be used in the composition, a particularly preferred radiation-curable optical glass fiber coating composition comprises:

a) an acrylate urethane oligomer;

b) about 5 wt % to about 80 wt % of a propoxylated (alkyl)phenol acrylate;

c) optionally one or more reactive diluents; and d) optionally an effective amount of at least one photo-initiating compound, and e) optionally additives.

Preferably, the radiation curable optical glass fiber coating composition containing a multifunctional propoxylated monomer or oligomer comprises:

a) about 30 wt. % to about 60 wt % of an acrylate functional urethane oligomer;

b) about 10 wt. % to about 70 wt % of a propoxylated (alkyl)phenol acrylate;

c) optionally up to about 10 wt % of one or more photoinitiators;

d) optionally up to about 33 wt % of one or more reactive diluents;

e) optionally up to about 10 wt % of an adhesion promoter; and f) optionally up to about 5 wt % of additives.

It is highly unexpected that the use of cure speed enhancing oligomers, such as propoxylated (alkyl)phenolacrylates, can be used to provide radiation-curable inner primary coating compositions having a cure speed such that 95% of the maximum attainable modulus can be obtained by a dose less than about 0.30 J/cm at a thickness of 75 microns. For instance, it is more difficult for polyethoxylated alkylphenolacrylates to exhibit such a cure speed enhancement. More in particular, it is possible in this way to achieve a cure speed such that a dose of about 0.01 to about 0.2 J/cm$^2$ provides 95% of the maximum attainable modulus at a thickness of 75 microns. Moreover, it has been observed that the propoxylated (alkyl) phenyl acrylates generally provide a higher modulus than comparable compositions containing ethoxylated (alkyl) phenyl acrylates.

The photoinitiator (d) can be a phosphine oxide compound such as, for example, 2,4,6 trimethylbenzoyl diphenylphosphine-oxide. Other examples of free radical-type photoinitiators (d) include, but are not limited to, the following:

hydroxycyclohexylphenyl ketone;
hydroxymethylphenylpropanone;
dimethoxyphenylacetophenone;
2-methyl-1-[4-(methyl thio)-phenyl]-2-morpholinopropanone-1;
1-(4-isopropylphenyl)-2-hydroxy-2-methylpropan-1-one;
1-(4-dodecyl-phenyl)-2-hydroxy-2-methylpropan-1-one;
4-(2-hydroxyethoxy)phenyl-2(2-hydroxy-2-propyl)-ketone;
diethoxyphenyl acetophenone;
a mixture of (2,6-dimethoxy benzoyl)-2,4,4 trimethylpentylphosphineoxide and 2-hydroxy-2-methyl-1-phenyl-propan-1-one;

and mixtures of these.

In producing a coated optical fiber, a liquid coating composition can be applied to the optical glass fiber and subsequently cured by exposure to actinic radiation. Typically, the cure is affected using ultraviolet or visible radiation. However, other methods are available. For example, the coating can be cured by electron beam irradiation where no catalyst is required.

If desired, more than one coating can be applied. Typically, an inner primary coating is applied on a bare optical glass fiber and cured, followed by an outer primary coating and so on until the desired number of coatings have been applied. Alternatively, the layers can be applied on top of each other as liquids, typically referred to as a wet-on-wet process, with one final curing step at the end.

In many applications involving optical fibers, it is desirable to have an outermost layer (outer primary coating) that is tough or hard enough to protect the optical fiber and underlying coatings, including an inner primary coating. The underlying coatings and inner primary coating are typically significantly softer in comparison to the outermost coating as is recognized in the art.

In particular, the coating compositions according to the present invention can surprisingly provide combination of properties of a very fast cure speed and excellent mechanical properties such as modulus, Tg, as well as excellent solvent resistance.

In particular, the inner primary coating compositions when suitably cured preferably possess a modulus of less than about 10 MPa, more preferably less than about 5 MPa, and a tan delta maximum glass transition temperature below about −10° C., and preferably below about −20° C.

The outer primary (or secondary) coating compositions when suitably cured preferably have a modulus of about 500 to about 1500 MPa, and a glass transition temperature higher than about 50° C.

Because of the fast curing properties obtainable with the present coating compositions, in a coated optical fiber including an inner primary coating and an outer primary coating, it is part of this invention to have either the inner primary coating, or the outer primary coating, or both being a cured composition according to the invention.

If the coating composition of the present invention is used as an inner primary coating, the composition preferably comprises an effective amount, for example about 0.3 to about 5 wt. %, of adhesion promoting compounds such as for example γ-mercaptopropyl trimethoxysilane or (meth) acryloxyalkyltrimethoxysilane.

Coated optical fibers are often used in assemblies, such as ribbon assemblies which are flat bands including a plurality of coated optical fibers, mostly between 4 and 12, covered with a matrix material. The individual coated optical fibers are often colored with a UV-curable ink. Because of the versatility of the presently invented radiation-curable composition, this composition is very well suited for use as a matrix material. Matrix materials are well known in the art and, and based on the disclosure provided herein, one skilled in the art will be able to formulate a suitable matrix forming composition having enhanced cure speed. A release agent can be utilized in the matrix material to allow easy access to the individual coated fibers. Suitable release agents are silicones, silicone acrylates, fluoro-carbon oils or resins and the like. Preferably, the matrix compositions for coating a plurality of optical fibers comprise about 0.5 to about 20 wt. % of a suitable release agent.

Coated optical fibers are often covered with an ink layer of about 5 to about 10 $\mu$m thickness in order to color the individual fibers to allow recognition of the fibers at the ends of a bundle of fibers. The ink layer can also be made from a radiation-curable composition which has been formulated according to the present invention to enhance the cure speed.

The coated optical glass fibers and ribbon assemblies made according to this invention can be used in telecommunication systems. Such telecommunication systems typically include cables containing optical glass fibers or ribbon assemblies, transmitters, receivers, and switches. The cables containing the optical glass fibers or ribbon assemblies are the fundamental connecting units of telecommunication systems.

The coated optical glass fibers and ribbon assemblies made according to this invention can be adapted for enclosure within a cabled structure. The cabled structure can be buried under ground or water for long distance connections, such as between cities. Alternatively, the coated optical glass fibers or ribbon assemblies can be adapted for use in local area networks, such as for connecting offices in high rise buildings, residential subdivisions, and the like.

The coated optical glass fibers and ribbon assemblies made according to this invention can also be used in cable television systems. Such cable television systems typically include cables containing optical glass fibers or ribbon assemblies, transmitters, receivers, and switches. The cables containing the optical glass fibers or ribbon assemblies are the fundamental connecting units of such cable television systems.

Radiation-curable compositions according to the present invention exhibit strong adhesion with fast cure speed. As such, the compositions can be used as a general radiation-curable adhesive for a wide variety of substrates, to include, for example, wood, paper, plastics, glass, ceramics and metals. The process of application and cure of a radiation-curable adhesive is well known and can be demonstrated by reference to a particular use, such as adhesion of layers of the various types of materials normally used in the production of optical disks and in particular in digital versatile disks (DVD) production processes.

The production of and useful characteristics for optical disks adhesives are discussed in, for example, U.S. Pat. Nos. 4,861,637 and 5,213,947, the complete disclosures of which are fully incorporated herein by reference.

Optical disks production is described in, for example, Network Formation by Chain Crosslinking Photopolymerization and its Applications in Electronics, by J. G. Kloosterboer in ADV. POLYM. SCI., 1988, 84, pp. 1–61, the complete disclosure of which is fully incorporated herein by reference.

In DVD applications, the radiation-curable compositions of the present invention, when used as an adhesive, will demonstrate superior adhesion to plastic, metallic and ceramic substrates. Typically the components of the composition are mixed together and coated on one surface of each of two polycarbonate substrates forming the DVD, which surfaces are already coated with an aluminum, gold or other layer encoded with audio, video or other information. The adhesive composition can be coated on the substrates by spin coating or other methods known in the art. The adhesive can then be cured with ultraviolet radiation. Radiation cure is commonly effected by using a fusion lamp equipped with a "D" bulb. Conventionally known curing processes are sufficient for DVD applications as well as for use of the compositions of the present invention as general-use radiation-curable adhesives.

The invention will be further explained by way of the following examples, without being limited thereto.

EXAMPLES 1 and 2

A radiation-curable oligomer was prepared from the following components:

hydroxyethylacrylate (H);

polytetramethylene ether glycol (PTHF) having a molecular weight of about 2000 (PTHF2000, BASF), and isophoronediisocyanate (I).

The above components were reacted under conditions to provide a theoretical formula of $H(I-PTHF)_2-I-H$.

Two inner primary coating compositions were prepared by combining the components shown in Table 1.

The radiation dose versus modulus curve was determined for each of the samples by measuring the modulus obtained for a specific radiation dose at a sample thickness of 75 microns. Cure is executed under a nitrogen atmosphere. The radiation dose which provided 95% of the maximum attainable modulus was determined from the radiation dose versus modulus curve, and is shown in Table 1.

TABLE 1

| Component (% by weight of total composition) | Example 1 | Example 2 |
|---|---|---|
| Oligomer H—(I-PTHF2000)$_2$-I—H | 40 | 40 |
| CH$_2$=CHCOO(CH$_2$(CH$_3$)CHO)$_{2.5}$-C$_6$H$_4$—C$_9$H$_{19}$ | 57 | 0 |
| CH$_2$=CHCOO(CH$_2$(CH$_3$)CHO)$_3$-C$_6$H$_4$—CH$_3$ | 0 | 57 |
| 2,4,6 Trimethylbenzoyl Diphenylphosphine Oxide | 3 | 3 |
| Test Results | | |
| Tensile Strength (MPa) | 0.8 | 0.3 |
| Elongation (%) | 95 | 52 |
| Modulus (MPa) | 1.6 | 1.5 |
| Viscosity at 25° C. (mPa · s) | 9240 | 2630 |
| Radiation Dose to Obtain 95% of Maximum Attainable Modulus (J/cm$^2$) | 0.27 | 0.29 |

The oligomer was made from the following components:
H = Hydroxyethyl Acrylate
I = Isophorone Diisocyanate
PTHF2000 = 2000 molecular weight polytetramethylene ether glycol The results in Table 1 demonstrate that the radiation dose to obtain 95% of maximum attainable modulus is <30 J/cm$^2$ and thus high cure speed coatings are achieved.

EXAMPLES 3–4 and

Comparative Examples A–H

A radiation-curable oligomer was prepared from the following components:

hydroxyethylacrylate (H);

polytetramethylene ether glycol (PTHF) having a molecular weight of about 2000 (PTHF2000, BASF), and isophoronediisocyanate (I).

The above components were reacted under conditions to provide a theoretical formula of $H(I-PTHF)_2-I-H$.

Eight inner primary coating compositions were prepared by combining the components shown in Table 2.

Figure 2:
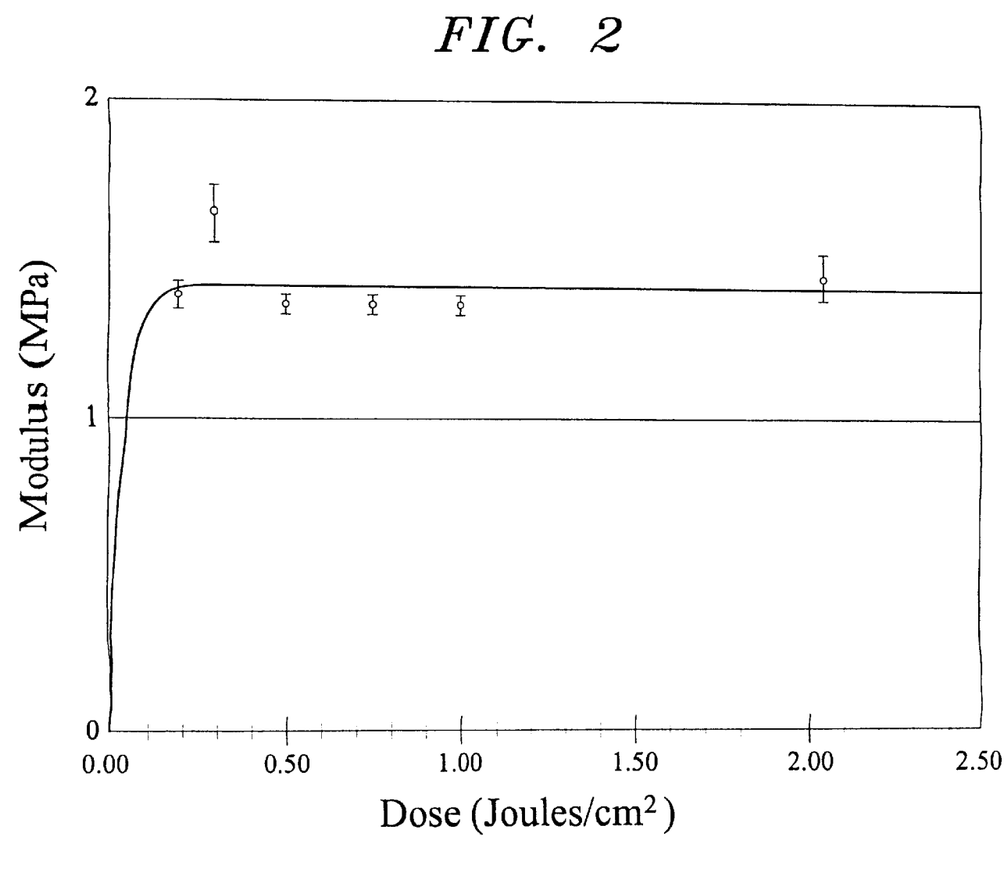
FIG. 2. illustrates a graph of the modulus versus the radiation dose applied to an enhanced cure-speed inner primary coating composition according to the present invention.

The radiation dose versus modulus curves for each of the Examples was determined. FIG. 1 represents the radiation dose versus modulus for Comparative Example H. FIG. 2 represents the radiation dose versus modulus for Example 3. The radiation dose which provided 95% of the maximum attainable modulus for each Example was determined from the radiation dose versus modulus cure, and is shown in Table 2.

EXAMPLES 5, 6, 7 and 8 and

Comparative Examples I, J and K

A radiation-curable oligomer was prepared from the following components:

hydroxyethylacrylate (H);

polytetramethylene ether glycol (PTHF) having a molecular weight of about 2000 (PTHF2000, BASF), and isophoronediisocyanate (I).

The above components were reacted under conditions to provide a theoretical formula of $H(I-PTHF)_2-I-H$.

Primary coating compositions were prepared by combining the components shown in Table 3.

Cure speed data was obtained from dose versus modulus curves and is expressed as the dose necessary to attain 95% of the ultimate modulus. Cure speed was also measured by the ratio of the modulus values at $0.2 \text{ J/cm}^2$. These results are summarized in Table 4. At 25% of diluent replacing the monomer diluent of the comparative example (see Table 3, f.n. 4), an increase in cure speed over Comparative Example I was seen with all three diluents (see Table 3, HDDA, EO

TABLE 2

| Component (% by weight of total composition) | Example 3 | Example 4 | Comp. Example A | Comp. Example B | Comp. Example C | Comp. Example D | Comp. Example E | Comp. Example F | Comp. Example G | Comp. Example H |
|---|---|---|---|---|---|---|---|---|---|---|
| Oligomer H—(I-PTHF2000)$_2$-I—H | 40 | 40 | 40 | 40 | 40 | 40 | 40 | 40 | 40 | 40 |
| Lauryl Acrylate | 0 | 10 | 20 | 30 | 40 | 0 | 10 | 20 | 30 | 40 |
| Propoxylated Nonylphenol Acrylate | 57 | 47 | 37 | 27 | 17 | 0 | 0 | 0 | 0 | 0 |
| Ethoxylated Nonylphenol Acrylate | 0 | 0 | 0 | 0 | 0 | 57 | 47 | 37 | 27 | 17 |
| LUCIRIN TPO (BASF) | 3 | 3 | 3 | 3 | 3 | 3 | 3 | 3 | 3 | 3 |
| Test Results | | | | | | | | | | |
| Modulus (MPa) (1.0 J/cm$^2$) | 1.3 | 1.2 | 1.2 | 1.1 | 0.9 | 1.2 | 1.1 | 0.9 | 0.9 | 1.2 |
| Dose @ 95% Modulus (J/cm$^2$) | 0.13 | 0.24 | 0.34 | 0.47 | 0.39 | 0.35 | 0.29 | 0.38 | 0.64 | 1.51 |

The oligomer was made from the following components:
H = Hydroxyethyl Acrylate
I = Isophorone Diisocyanate
PTHF2000 = 2000 molecular weight polytetraruethylene ether glycol (BASF)

The results in Table 2 demonstrate that the present invention provides a very unexpected feature. One skilled in the art would expect that as the amount of propoxylated nonylphenol acrylate is increased, the cure speed would drop off significantly, based on the results of Comparative Examples D and E. In particular, Comparative Example D had a higher dose (slower cure speed) than Comparative Example E. In contrast, surprisingly, the cure speed of the present invention dramatically increases as the amount of propoxylated nonylphenol acrylate is increased, as shown by Examples 3 and 4. In particular, Example 3 required a lower dose (faster cure speed) than that of Example 4. Based on the results of Comparative Examples D and E, one skilled in the art would have expected that Example 3 would have required a greater dose (slower cure speed) than Example 4. In sum, propoxy and ethoxy groups have an unexpectedly opposite effect on cure speed in compositions having larger amounts of the propoxylated or ethoxylated monomers.

Furthermore, it was quite unexpected that such a fast cure speed could be reached by an inner primary coating (doses of 0.13, and 0.24, Examples 3 and 4).

and PO, f.n.'s 5,6 and 7 respectively), but little difference was seen between the compositions containing those three diluents. However, at 50% replacement of the monomer diluent of the comparative example (see Table 3, f.n. 4), little improvement is seen with the HDDA diluent or EO diluent compositions, but the PO diluent composition showed a substantial increase in cure speed.

Tensile strength, elongation and modulus, as well as Tg and equilibrium modulus were also measured and are also shown in Table 4.

It is also noted that the replacement of the monomer diluent of the comparative example (see Table 3, f.n. 4) with either HDDA, EO or PO diluents resulted in the composition having lower viscosity. This result was surprising in that the EO has a viscosity of 6–12 mPas and the PO has a higher viscosity of 15–25 mPas. Also surprising was the observation that the composition containing the more viscous PO diluent had a lower viscosity than did the composition containing the less viscous EO diluent.

TABLE 3

COMPOSITION FORMULATIONS CONTAINING HDDA, ETHOXYLATED MONOMER (EO)
AND PROPOXYLATED MONOMER (PO)

| Component (wt.%) | Comp. Ex. I | Comp. Ex. J | Comp. Ex. K | Ex. 5 | Ex. 6 | Ex. 7 | Ex. 8 |
|---|---|---|---|---|---|---|---|
| Oligomer H—(I-PTHF1000)$_2$-I—H | 70.00 | 70.00 | 70.00 | 70.00 | 70.00 | 70.00 | 70.00 |
| CGI 1700[2](Ciby-Geigy) | 3.00 | 3.00 | 3.00 | 3.00 | 3.00 | 3.00 | 3.00 |
| IRGANOX 1035[3] (Ciba-Geigy) | 0.50 | 0.50 | 0.50 | 0.50 | 0.50 | 0.50 | 0.50 |
| monomer diluent[4] | 25.50 | 19.12 | 12.75 | | | | |
| HDDA[5] | | 6.38 | 12.75 | 19.12 | | 12.75 | 12.75 |
| ethoxylated monomer[6] (EO) | | | | 6.38 | | 12.75 | |
| propoxylated monomer[7] (PO) | | | | | 6.38 | | 12.75 |
| γ-mercaptopropyl trimethoxy silane (adhesion promoter) | 1.00 | 1.00 | 1.00 | 1.00 | 1.00 | 1.00 | 1.00 |

The oligomer was made from the following components:
H = Hydroxyethyl Acrylate
I = Isophorone diisocyanate
PTHF2000 = 2000 molecular weight polytetramethylene ether glycol (BASF)
[2]2 CGI 1700 (Ciba-Geigy) = a mixture of bis(2,3-dimethoxybenzoyl)-2,2,4-trimethylpentylphosphine oxide)
[3]IRGANOX 1035 (Ciba-Geigy) = hindered phenolic antioxidant
[4]Ethoxylated nonlyphenol Acrylate Ester
[5]1,6-Hexanediol diacrylate
[6]Ethoxylated 1,6-Hexanediol diacrylate
[7]Propoxylated 1,6-Hexanediol diacrylate

TABLE 4

PHYSICAL PROPERTY DATA FORMULATIONS
CONTAINING HDDA, ETHOXYLATED MONOMER (EO)
AND PROPOXYLATED MONOMER (PO)

| Property | 100% HDDA Ex. I | Comp. Ex. J 25% HDDA | Ex. 5- 25% EO | Ex. 6- 25% PO | Comp. Ex. K 50% HDDA | Ex. 7- 50% EO | Ex. 8- 50% PO |
|---|---|---|---|---|---|---|---|
| Viscosity (mPa · s) | 4950 | 4150 | 4600 | 4000 | 3250 | 3800 | 3450 |
| Tensile (MPa) | 0.7 | 1.7 | 1.8 | 0.3 | 2.2 | 1.3 | 1.9 |
| Elongation (%) | 84 | 59 | 69 | 12 | 40 | 34 | 51 |
| Modulus (MPa) | 1.5 | 3.7 | 3.6 | 2.8 | 6.5 | 5 | 4.4 |
| Dose for 95% of modulus (J/cm$^2$) | 0.54 | 0.4 | 0.43 | 0.42 | 0.41 | 0.42 | 0.31 |
| Modulus Ratio 0.2/1.0 J/cm$^2$ | 0.63 | 0.8 | 0.74 | 0.75 | 0.87 | 0.76 | 0.86 |
| $E_o$(MPa) | 1.8 | 4.6 | 3.8 | 3.4 | 8.8 | 6 | 5 |
| T ° C.E' = 1000 MPa | −35.1 | −29 | −32.5 | −34.6 | −26.1 | −28.9 | −32.1 |
| T ° C.E' = 100 MPa | −23.8 | −16 | −18.2 | −22 | −7.7 | −13.9 | −16.9 |
| Tg(° C.; Tanσ) | −17.7 | −10 | −13.5 | −15.4 | −0.2 | −9 | −11.9 |

Test Methods

Modulus

The modulus was measured using a universal testing instrument, Instron Model 4201 equipped with a personal computer and software "Series IX Materials Testing System." The load cells used were 2 and 20 pound capacity. The ASTM D638M was followed, with the following modifications:

A drawdown of the material to be tested was made on a glass plate and cured using a UV processor. The cured film was conditioned at 23° C. and 50±5% relative humidity for a minimum of sixteen hours prior to testing.

A minimum of eight test specimens, having a width of 0.5±0.002 inches and a length of 5 inches, were cut from the cured film. To minimize the effects of minor sample defects, sample specimens were cut parallel to the direction in which the drawdown of the cured film was prepared. If the cured film was tacky to the touch, a small amount of talc was applied to the film surface using a cotton tipped applicator.

The test specimens were then removed from the substrate. Caution was exercised so that the test specimens were not stretched past their elastic limit during the removal from the substrate. If any noticeable change in sample length had taken place during removal from the substrate, the test specimen was discarded.

If the top surface of the film was talc coated to eliminate tackiness, then a small amount of talc was applied to the bottom surface of the test specimen after removal from the substrate.

The average film thickness of the test specimens was determined. At least five measurements of film thickness were made in the area to be tested (from top to bottom) and the average value used for calculations. If any of the measured values of film thickness deviated from the average by more than 10%, the test specimen was discarded. All specimens came from the same plate.

The appropriate load cell was determined by using the following equation:

$$[A \times 145] \times 0.0015 = C$$

Where: A=Product's maximum expected tensile strength (MPa); 145=Conversion Factor from MPa to psi; 0.00015=approximate cross-sectional area (in$^2$) of test specimens; and C=lbs. The 2 pound load cell was used for materials where C=1.8 lbs. The 20 pound load cell was used for materials where 1.8<C<18 lbs. If C>19, a higher capacity load cell was required.

The crosshead speed was set to 1.00 inch/min, and the crosshead action was set to "return at break". The crosshead was adjusted to 2.00 inches jaw separation. The air pressure for the pneumatic grips was turned on and adjusted as follows: set approximately 20 psi (1.5 Kg/cm$^2$) for primary optical fiber coatings and other very soft coatings; set approximately 40 psi(3 Kg/cm$^2$) for optical fiber single coats; and set approximately 60 psi(4.5 Kg/cm$^2$) for secondary optical fiber coatings and other hard coatings. The appropriate Instron computer method was loaded for the coating to be analyzed.

After the Instron test instrument had been allowed to warm-up for fifteen minutes, it was calibrated and balanced following the manufacturer's operating procedures.

The temperature near the Instron Instrument was measured and the humidity was measured at the location of the humidity guage. This was done just before beginning measurement of the first test specimen.

Specimens were analyzed under such conditions that the temperature was 23° C. and the relative humidity was within 50±5%. The temperature was within this range for each test specimen. The humidity value was verified at the beginning and the end of testing a set of specimens from one plate.

Each test specimen was tested by suspending it into the space between the upper pneumatic grips such that the test specimen was centered laterally and hanging vertically. Only the upper grip was locked. The lower end of the test specimen was pulled gently so that it has no slack or buckling, and it was centered laterally in the space between the open lower grips. While holding the specimen in this position, the lower grip was locked.

The sample number was entered and sample dimensions into the data system, following the instructions provided by the software package.

The temperature and humidity were measured after the last test specimen from the current drawdown was tested. The calculation of modulus was performed automatically by the software package. The values for modulus were checked to determine whether any one of them deviated from the average enough (±3 sigma) to be an "outlier." If the modulus value was an outlier, it was discarded. The average modulus was reported.

While this invention has been explained in detail and with reference to specific embodiments thereof, it will be apparent to one of ordinary skill in the art that various changes and modifications can be made therein without departing from the spirit and scope thereof.

What is claimed is:

1. A radiation-curable composition comprising:
   (a) at least about 30 weight %, relative to the total weight of the composition, of an (alkyl)phenol acrylate comprising a branched propoxy group directly bonded to said acrylate;
   (b) from about 30 wt % to about 60 wt %, relative to the total weight of the composition, of a radiation-curable polyether oligomer having a polyether backbone and an acrylate functional group bonded to the backbone via urethane linking group, said backbone consisting essentially of ether moieties;
   (c) a photoinitiator; and
   (d) γ-mercaptopropyltrimethoxysilane and/or (meth) acryloxyalkyltrimethoxysilane.

2. A composition according to claim 1, wherein said composition is a radiation-curable glass-optical fiber coating composition.

3. A composition according to claim 1, wherein said composition is an outer primary, ink, or ribbon material radiation-curable glass-optical fiber coating composition.

4. A composition according to claim 1, wherein said composition is an inner primary, radiation-curable glass-optical fiber coating composition, which provides an inner primary coating having a modulus of about 10 MPa or less when cured.

5. A composition according to claim 1, wherein said composition is an inner primary, radiation-curable glass-optical fiber coating composition, which provides an inner primary coating having a modulus of about 5 MPa or less when cured.

6. The radiation-curable composition of claim 1, wherein said composition is an inner primary coating composition.

7. A composition according to claim 1, wherein said composition is a rapid prototyping radiation-curable composition.

8. A composition according to claim 1, wherein said composition is an adhesive used in the production of digital versatile disks.

9. The composition of claim 1, comprising an acyl phosphine oxide photoinitiator.

10. The composition of claim 1, further comprising a reactive diluent.

11. The composition of claim 1, comprising at least 45 weight %, relative to the total composition, of said (alkyl) phenol acrylate.

12. A composition according to claim 11, which is formulated to have a cure speed such that 95% of the maximum attainable modulus is obtained after irradiation of about 0.01 to about 0.2 J/cm$^2$ at a thickness of 75 microns.

13. The composition of claim 11, wherein a 75 micron thick layer of said composition reaches at least 95 % of its maximum attainable tensile modulus when irradiated with a dose of about 0.30 J/cm$^2$ or less.

14. The composition of claim 13, wherein said dose is 0.25 J/cm$^2$ or less.

15. The composition of claim 1, wherein said propoxylated (alkyl)phenol acrylate comprises, on average, less than 6 propoxy groups.

16. The composition of claim 1, wherein said (alkyl) phenol acrylate is propoxylated nonylphenol acrylate.

17. A radiation-curable composition consisting essentially of:
   (a) one or more reactive diluents;
   (b) at least about 30 weight %, relative to the total weight of the composition, of propoxylated nonylphenol acrylate;
   (c) one or more radiation-curable oligomers;
   (d) one or more photoinitiators; and
   (e) γ-mercaptopropyltrimethoxysilane and/or (meth) acryloxyalkyltrimethoxysilane;
   wherein each of said one or more radiation-curable oligomers consists essentially of polyether diol residues, diisocyanate residues, and hydroxyethylacrylate residues.

18. The radiation-curable composition of claim 17, wherein said composition is an inner primary coating composition.

19. A radiation-curable composition comprising:
(a) propoxylated nonylphenol acrylate;
(b) one or more radiation-curable polyether oligomers consisting essentially of polyether diol residues, diisocyanate residues, and hydroxyethylacrylate residues;
(c) one or more photoinitiators; and
(d) γ-mercaptopropyltrimethoxysilane and/or (meth)acryloxyalkyltrimethoxysilane;
wherein said radiation-curable composition has a faster cure speed than a comparable composition, said comparable composition being identical to said radiation-curable composition except that said propoxylated nonylphenol acrylate in said radiation-curable composition has been replaced in said comparable composition with an identical weight amount of ethoxylated nonylphenol acrylate.

20. The radiation-curable composition of claim 19, wherein said radiation-curable composition consists essentially of the components (a)–(d).

21. The radiation-curable composition of claim 20, wherein said radiation-curable composition comprises, relative to the total weight of said radiation-curable composition, at least 30 wt % of propoxylated nonylphenol acrylate.

22. The radiation-curable of composition of claim 20, wherein said composition is an inner primary coating composition.

23. The radiation-curable composition of claim 19, wherein said radiation-curable composition comprises, relative to the total weight of said radiation-curable composition, at least 30 wt % of propoxylated nonylphenol acrylate.

24. The radiation-curable composition of claim 20, wherein said composition is an inner primary coating composition.

25. A radiation-curable composition comprising:
(a) at least about 30 weight %, relative to the total weight of the composition, of an (alkyl)phenol acrylate comprising a branched propoxy group directly bonded to said acrylate;
(b) from about 30 wt % to about 60 wt %, relative to the total weight of the composition, of a radiation-curable polyether oligomer having a polyether backbone, said backbone consisting essentially of ether moieties;
(c) a photoinitiator; and
(d) γ-mercaptopropyltrimethoxysilane and/or (meth)acryloxyalkyltrimethoxysilane;
wherein said radiation-curable polyether oligomer consists essentially of polyether diol residues, diisocyanate residues, and hydroxyethylacrylate residues.

26. A radiation-curable composition consisting essentially of:
(a) propoxylated nonyl phenol acrylate;
(b) a polyether oligomer prepared from polyether diol, diisocyanate and hydroxyethyl acrylate;
(c) one or more photoinitiator; and
(d) γ-mercaptopropyltrimethoxysilane and/or (meth)acryloxyalkyltrimethoxysilane.

27. A radiation-curable composition of claim 26, wherein said composition comprises, relative to the total weight of said composition:
(a) at least 30 wt % of propoxylated nonyl phenol acrylate; and
(b) about 30 wt % to about 60 wt % of said polyether oligomer.

28. A radiation-curable composition of claim 27, wherein said radiation-curable composition is an inner primary coating composition.

* * * * *